United States Patent [19]

Prine

[11] 4,095,364
[45] Jun. 20, 1978

[54] FISHING ROD HOLDER FOR A FISHING TACKLE BOX

[76] Inventor: Verle Orval Prine, 33 Nightingale, Billings, Mont. 59101

[21] Appl. No.: 763,369

[22] Filed: Jan. 28, 1977

[51] Int. Cl.² .............................................. A01K 97/10
[52] U.S. Cl. ................................. 43/21.2; 43/54.5 R; 248/535
[58] Field of Search ........................... 43/21.2, 54.5 R; 248/534, 535, 538

[56] References Cited

U.S. PATENT DOCUMENTS

| | | | |
|---|---|---|---|
| 2,596,403 | 5/1952 | Hoffman | 43/21.2 |
| 3,095,663 | 7/1963 | Miller | 43/21.2 |
| 3,327,978 | 6/1967 | Gates | 43/21.2 X |
| 3,543,432 | 12/1970 | Gates | 43/54.5 R |
| 3,555,719 | 1/1971 | Butler | 43/54.5 R |
| 4,014,128 | 3/1977 | Hrdlicka | 43/21.2 |
| 4,050,178 | 9/1977 | Bryan | 43/21.2 |

Primary Examiner—Louis G. Mancene
Assistant Examiner—Daniel J. Leach
Attorney, Agent, or Firm—Paul J. Van Tricht

[57] ABSTRACT

A fishing rod holder for a fishing tackle box comprising a base which is attached to a side of a fishing tackle box and an elongated tubular member which is hingedly attached to the base at one end and extends from the base. The middle portion of the elongated tubular member bends back upon the base and forms a yoke. The remaining end of the elongated tubular member is detachably attached to the base. When not in use the detachable end of the elongated tubular member is attached to the base and the elongated tubular member is positioned adjacent a side of the tackle box. When in use the detachable end of the elongated tubular member is detached from the base, the elongated tubular member is rotated away from the base to the surface which supports the tackle box, and the yoke is placed in a vertical position to support a fishing rod.

8 Claims, 3 Drawing Figures

FISHING ROD HOLDER FOR A FISHING TACKLE BOX

BACKGROUND OF THE INVENTION

1. Field of the Invention

The subject invention relates to fishing rod holders; more particularly the subject invention relates to fishing rod holders attached to fishing tackle boxes.

2. Description of the Prior Art

An appreciation and understanding of the prior art can be obtained by considering the following U.S. Pat. Nos.: 3,956,846, Kent, May 18, 1976; 3,835,568, Whitfield, Sept. 17, 1974; 3,603,019, Smeltzer, Sept. 7, 1971; 3,555,719, Butler, Jan. 19, 1971; 3,543,432, Gates, Dec. 1, 1970; 3,327,978, Gates, June 27, 1967; 3,095,663, Miller, July 2, 1963.

The subject invention offers several improvements over the prior art. First, the subject invention is simple in construction and operation. Second, the subject invention is attached to the tackle box in such a manner that while the fishing rod holder is in use the tackle box may be opened and closed without interfering with the fishing rod holder and fishing rod. Third, when not in use the fishing rod holder fits securely and snugly against the side of the tackle box and does not interfere with movement of the fishing tackle box.

SUMMARY OF THE INVENTION

The subject invention provides a fishing rod holder attached to a fishing tackle box. The fishing rod holder comprises a base and an elongated tubular member. The base is mounted on a side of the fishing tackle box. One end of the elongated tubular member which extends from the base is hingedly attached to the base. The middle portion of the elongated tubular member forms a yoke and bends back upon the base and the hingedly attached end of the elongated tubular member. The remaining end of the elongated tubular member is detachably attached to the base. When not in use the detachable end of the elongated tubular member is attached to the base and the elongated tubular member is placed in a horizontal position adjacent a side of the fishing tackle box. When in use the detachable end of the elongated tubular member is detached from the base, the elongated tubular member is rotated away from the base, the detachable end is placed on a surface adjacent to the fishing tackle box, and the yoke is placed in a vertical fishing rod supporting position.

DESCRIPTION OF THE PREFERRED EMBODIMENT

Figure 1:
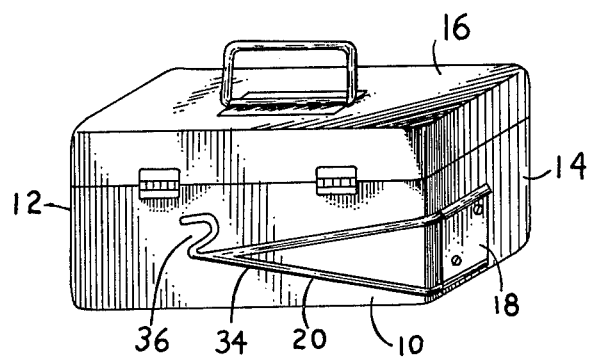
FIG. 1 is a perspective view of the fishing rod holder attached to a tackle box while not in use.

Referring now to FIG. 1, the fishing rod holder 10 of the present invention is attached to a fishing tackle box 12. The fishing tackle box 12 may be any one of the numerous conventional commercial tackle boxes on the market. The preferred tackle box 12 has a main bottom portion 14 and a top lid portion 16. The two portions 14 and 16 of the tackle box 12 are hinged together in a conventional manner.

The fishing rod holder 10 comprises a base 18 and an elongated tubular member 20. The base 18 is attached to a side of the bottom portion 14 of the tackle box 12 by conventional means, e.g., screws, rivets and the like. The base 18 preferably is a thin, flat body made out of plastic or metal. Alternately, the base 18 may be formed from the side of the tackle box 12 itself. The elongated tubular member 20 preferably is a semiflexible metal or plastic rod, e.g., a solid or hollow aluminum or steel rod.

Figure 2:
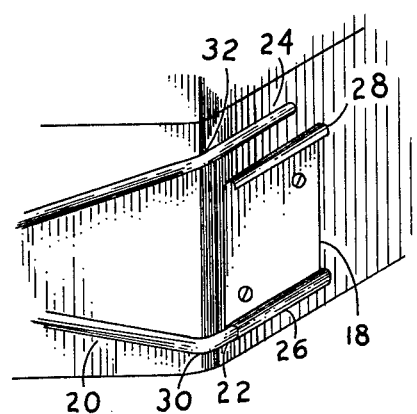
FIG. 2 is an enlarged perspective view of the base of the fishing rod holder and of the two ends of the elongated tubular member.

Referring now to FIG. 2, one end 22 of the elongated tubular member 20 is hingedly attached to the base 18. The hinged attachment of the one end 22 of the elongated tubular member 20 permits rotation of the elongated tubular member 20 about the base 18. The hingedly attached end 22 may be attached to the base 18 by a number of conventional means, e.g., hooks, pins, clamps and the like. In the preferred embodiment the hingedly attached end 22 of the elongated tubular member 20 is attached to the base 18 by means of a flange 26 which extends from a side of the base 18 and securely encircles the hingedly attached end 22 of the elongated tubular member 20 so as to permit the vertical rotation of the elongated tubular member 20 about the base 18. The elongated tubular member 20 first extends from the base 18 and then bends back upon itself at an angle of approximately 160° and to the base.

The remaining end 24 of the elongated tubular member 20 is detachably attached to the base 18. The detachable end 24 of the elongated tubular member 20 may be attached to the base 18 by a number of conventional means, e.g., hooks, pins, clamps and the like. In the preferred embodiment the detachable end 24 of the elongated tubular member 20 is attached to the base 18 by means of an open flange 28.

Referring now to FIGS. 1 and 2, in the preferred embodiment portions 30 and 32 of the elongated tubular member 20 which are adjacent the ends 22 and 24 of the elongated tubular member 20 are bent at a substantially right angle to the base 18. The bent portions 30 and 32 of the elongated tubular member 20 permit the middle portion 34 of the elongated tubular member 20 to rest adjacent a side of the bottom portion 14 of the tackle box 12 which is perpendicular to the side of the tackle box 12 on which the base 18 is attached. In this position the fishing rod holder 10 does not interfere with the movement of the fishing tackle box 12.

Referring now to FIG. 1, the middle portion 34 of the elongated tubular member 20 which bends back to the base 18 also forms a yoke 36. The yoke 36 is capable of cradling and supporting a fishing rod. In the preferred embodiment the yoke 36 is a "U" or "V" shaped yoke.

Figure 3:
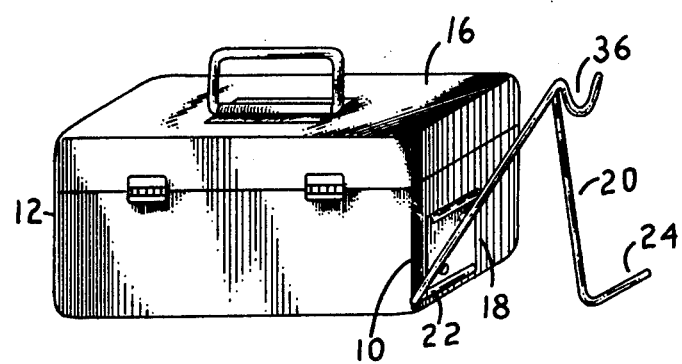
FIG. 3 is a perspective view of the fishing rod holder in a position to support a fishing rod.

Referring now to FIG. 3, when the fishing rod holder 10 is in use, the detachable end 24 of the elongated tubular member 20 is detached from the base 18 and the elongated tubular member 20 is rotated vertically about the base 18 and the fishing tackle box 12. The detachable end 24 of the elongated tubular member 20 is placed on the surface, e.g., ground, beach, or deck, which is supporting the tackle box 12, so as to place the yoke 36 in a vertical position in which the yoke 36 is capable of supporting a fishing rod. While a fishing rod is supported by the fishing holder 10, the tackle box lid 16 may be opened and closed to gain access to the fishing tackle in the fishing tackle box 12.

I claim:

1. A fishing rod holder comprising:
   (a) a base attached to a side of a fishing tackle box; and
   (b) an elongated tubular member, the one end of which is hingedly attached to the base, the middle portion of which forms a yoke which is capable of supporting a fishing rod, and the remaining end of which is detachably attached to the base.

2. A fishing rod holder of claim 1 wherein the base is mounted on one side of the fishing tackle box and the elongated tubular member is bent at a substantially right angle to the base to rest the middle portion of the elongated tubular member adjacent a side of the tackle box which is perpendicular to the side of the fishing tackle box on which the base is to be attached.

3. A fishing rod holder of claim 2 wherein the hingedly attached end of the elongated tubular member is fixed to the base by a flange which extends from a side of the base and encircles the hingedly attached end of the elongated tubular member.

4. A fishing rod holder of claim 3 wherein the detachable end of the elongated tubular member is detachably attached to the base by an open flange.

5. A fishing rod holder of claim 4 wherein the middle portion of the elongated tubular member forms a substantially "V" shaped yoke.

6. A fishing rod holder of claim 4 wherein the middle portion of the elongated tubular member form into a substantially "U" shaped yoke.

7. A fishing rod holder of claim 1 wherein the base is formed from the side of the fishing tackle box.

8. A fishing rod holder of claim 1 wherein the elongated tubular member first extends from the base, then bends back upon itself and to the base.

* * * * *